Figure 1:
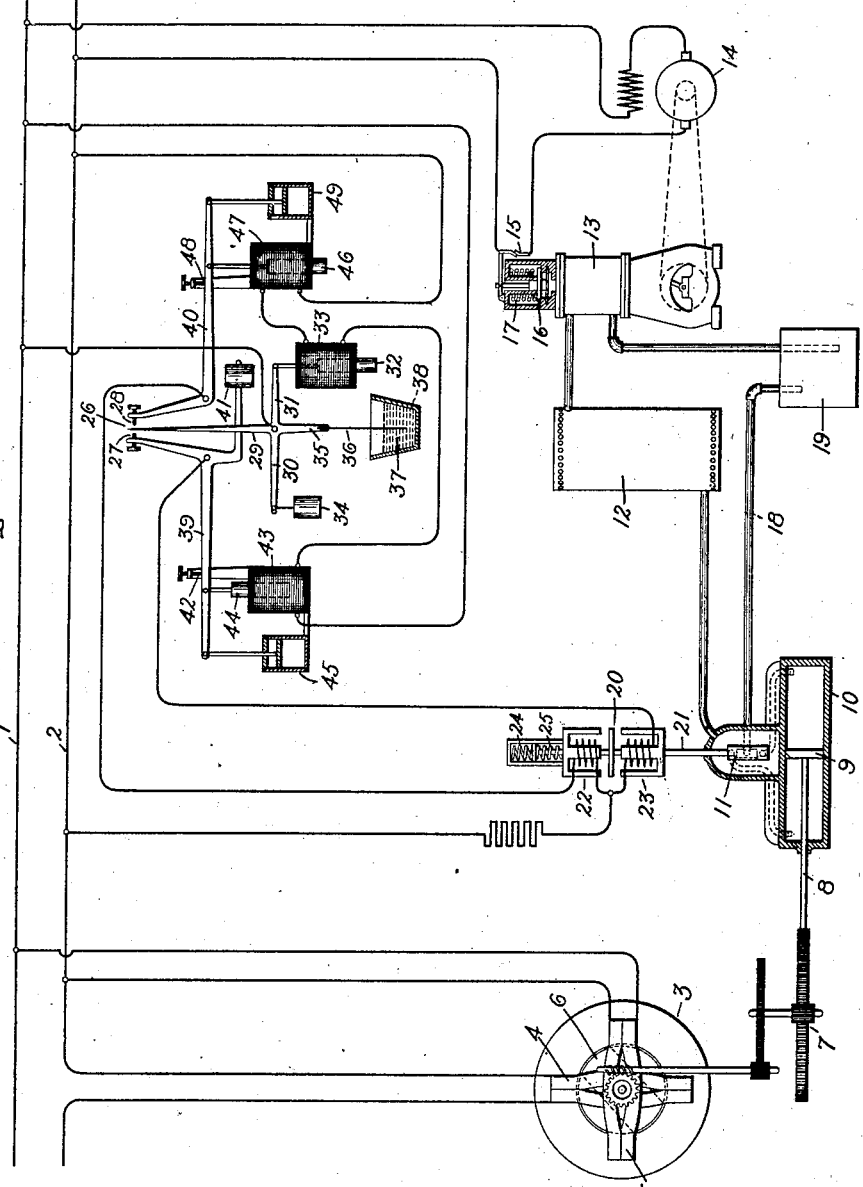

No. 728,300. PATENTED MAY 19, 1903.
E. W. RICE, Jr.
ELECTRIC REGULATOR.
APPLICATION FILED NOV. 5, 1902.
NO MODEL.
2 SHEETS—SHEET 1.

Witnesses.
George W. Tilden.
Helen Oxford.

Inventor.
Edwin W. Rice Jr.
by Albert G. Davis
Att'y.

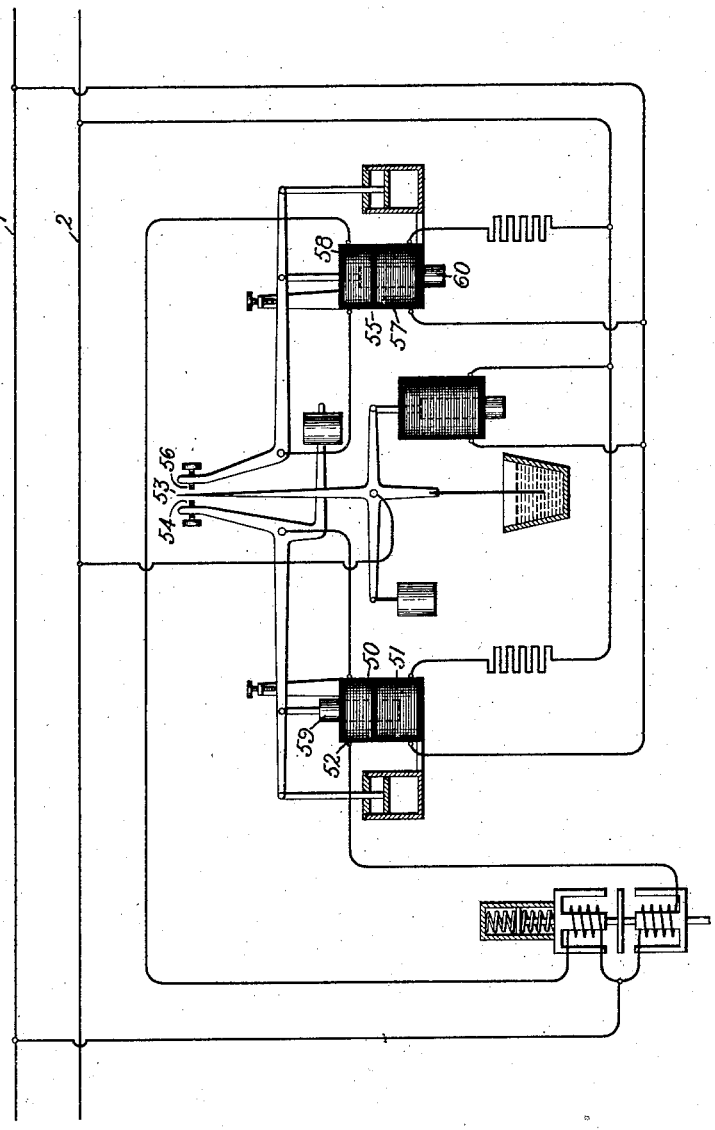

No. 728,300.

Patented May 19, 1903.

UNITED STATES PATENT OFFICE.

EDWIN W. RICE, JR., OF SCHENECTADY, NEW YORK, ASSIGNOR TO GENERAL ELECTRIC COMPANY, A CORPORATION OF NEW YORK.

ELECTRIC REGULATOR.

SPECIFICATION forming part of Letters Patent No. 728,300, dated May 19, 1903.

Application filed November 5, 1902. Serial No. 130,145. (No model.)

*To all whom it may concern:*

Be it known that I, EDWIN W. RICE, Jr., a citizen of the United States, residing at Schenectady, county of Schenectady, State of New York, have invented certain new and useful Improvements in Electric Regulators, of which the following is a specification.

My invention relates more particularly to electric regulators and is embodied in a regulator in which the regulating action is checked as soon as the proper regulating effect has been secured without permitting the regulating action to pass through a series of oscillations or surges of decreasing amplitude about the desired point.

One of the principal objects of my invention is, in other words, to avoid what is known as "hunting" or "pumping" of the regulator.

In carrying my invention into practice I make use of a novel form of controlling mechanism, which I operate in connection with any desired regulating mechanism, the regulating mechanism being governed in its motions by the controlling mechanism.

The various features of novelty which constitute my invention I have pointed out with particularity in the appended claims, while in the following description, which is to be taken in connection with the accompanying drawings, I have set forth my invention as embodied in a regulating system for controlling the voltage of an electric distribution or transmission system.

Figure 1 is a representation, partly in diagram, of one embodiment of my invention, while Fig. 2 is a view of a modified form of controlling device or mechanism.

An alternating-current transmission system provided with regulating mechanism arranged in accordance with my invention is shown in Fig. 1, in which the lines 1 2 represent conductors forming part of an electric distribution or transmission system the voltage of which it is desired to control. It is obvious that the immediate means for controlling the voltage may differ widely. Thus, for example, the field strength of the generator (in this case not shown) may be varied or the speed of the generator may be changed or various other means employed without departing from my invention. In the present instance, however, I have assumed that the system is to be regulated by a potential-regulator of well-known construction and such, for example, as is set forth more in detail in the patent to Steinmetz, No. 548,400, dated October 22, 1895. A winding 4 on this regulator is in a series with one of the mains—as, for example, the main 2—while a second winding 5, located in this instance at right angles to the winding 4, is connected in shunt to the mains 1 2. A flattened body 6 of magnetic material is located within these coils or windings and is mounted on bearings, so that it may be rotated. By changing the angular position of this body the mutual induction between the series and the potential coils may be varied, thereby causing the potential coil to exert a correspondingly-varied boosting effect upon the series coil, this boosting effect acting to regulate the voltage of the lines 1 and 2 as desired.

For the purpose of mechanically actuating the regulator 3 I may connect the rotating member thereof through gearing 7, of any suitable construction, to a piston-rod 8, extending from a piston 9, to which motion is communicated by fluid-pressure derived from any suitable source. The piston 9 of the actuating device is movable within a cylinder 10, to which some suitable fluid, as oil, may be admitted through the operation of a controlling-valve—such, for example, as 11. The oil may be contained in a tank 12, in which it is maintained under pressure by means of some suitable pump. In the present instance I have by way of illustration indicated a pump 13, driven by an electric motor 14, the circuit of which is controlled automatically by a switch 15, which through the action of the fluid-pressure is caused to close when the pressure is too low and to open when the pressure is too high, the opening and closing of the switch being governed by a piston 16, operated upon by the fluid-pressure and acting in opposition to a properly-adjusted spring 17. The oil after it has been admitted to the cylinder 10 and has moved the piston thereof in either direction is then discharged through the exhaust-pipe 18 into a receiving-tank 19, from which it is drawn by the pump 13 and again forced into the tank 12.

The valve 11, which controls the fluid actuating device, is in turn actuated magnetically through the operation of a controlling device shown at the upper right-hand portion of Fig. 1. The magnetic actuating means consists of an armature 20, carried by a rod 21 and mounted in proximity to a pair of magnets 22 and 23, the circuits of which are opened and closed by the controlling device. Centering-springs 24 and 25, acting on the valve-stem 21, serve to maintain the valve 11 in its closed or intermediate position. When one of the magnets is energized, the valve 11 will be moved in one direction, thereby causing a corresponding movement of the piston 9, while when the other magnet is energized an opposite resulting motion of the piston 9 will take place.

Passing now to the consideration of the electric controlling device shown in the upper right-hand portion of Fig. 1 and in which my invention chiefly resides, it will be seen to embody three electrically-controlled contacts— one a main contact 26 and two coöperating contacts 27 28. Each of these contacts is movable in response to changes in voltage upon the alternating-current system and is actuated or controlled in its movement by a solenoid, the solenoids corresponding to the three contacts being in the present instance connected in series with each other across the mains 1 2. The main contact 26 is carried by or forms a portion of a pivoted arm 29, provided with two oppositely-extending lever-arms 30 and 31, from one of which is suspended a solenoid-core 32, coöperating with the solenoid 33, and from the other a counterbalancing-weight 34. An arm 35, depending from the pivoted member just described, carries a paddle 36, dipping in a body of some fluid 37—such, for example, as glycerin— contained in a suitable receptacle 38, the purpose of this construction being to damp or steady the movements of the pivoted member. The parts are adjusted so that the solenoid 33 when traversed by current pulls upward upon the core 32, the counterbalancing being arranged so that when normal current is passing, corresponding to normal voltage upon the alternating-current system, the main contact is in a position of equilibrium midway between its coöperating contacts. Each coöperating contact is carried by a bell-crank lever, the contact 27 being mounted on the bell-crank lever 39 and the contact 28 upon the other bell-crank lever 40. A counterbalancing-weight 41 urges the horizontal member of the bell-crank lever 39 up against an adjustable stop 42, and this horizontal member is in turn acted upon by a solenoid 43, which tends to draw down upon a coöperating core 44, suspended from said member. A dash-pot 45 serves to render the motion produced by the solenoid 43 relatively slow compared with the motion of the main contact 26. The remaining coöperating contact 28 is, as has been mentioned, mounted upon the bell-crank lever 40; but this lever differs in arrangement from the bell-crank lever 39. It has suspended therefrom a solenoid-core 46; but this core instead of being pulled downward by its coöperating solenoid 47 is urged upward, thereby urging the horizontal member of the lever into contact with the adjustable stop 48. This lever also is provided with a dash-pot 49 or other device for rendering its motion slow as compared with the motion of the main contact. The levers carrying the main contact and the coöperating contacts are proportioned relatively to each other and are arranged with respect to their actuating-solenoids, so that a given variation of voltage on the mains 12 tends to cause a much larger movement or deflection of the main contact than of its coöperating contacts. Thus as an illustration the main contact might move, say, half a notch from its middle position under the influence of a one or two volt fluctuation of voltage of the mains 1 2 from the normal, while its coöperating contacts under the same conditions move, say, one-tenth the distance. Under very small variations of current, therefore, the regulating mechanism controlled by the contact-making device is actuated substantially the same as though the coöperating contacts 27 and 28 were fixed. If, however, a large variation of voltage were to occur on the mains— as, for example, a drop in voltage of fifteen or twenty volts—then the main contact 26 would instantly move into engagement with its coöperating contact 28, and this contact under the weakening action of the solenoid 47 would slowly retreat, being restrained in its movement by the rather stiff acting dash-pot 49. The regulator 3 would therefore be turned quickly and continuously in a direction to raise the voltage of the mains, and this action would continue uninterruptedly until the voltage had been brought back within, say, a volt or two of normal, whereupon the main contact would separate from the coöperating contact 28 and commence to return to its middle position. As soon, however, as the separation takes place the movement of the regulator 3 will cease. In the meantime the coöperating contact 28, under the restraining influence of the dash-pot 49, would be slowly returned until contact is again made with the main contact 26, whereupon the regulator 3 would be again moved, thus bringing the voltage of the mains 1 2 still closer to normal value. The main contact therefore would again move away from the coöperating contact toward its middle position, again causing a separation and a repetition of the action thus described until the voltage of the mains is brought back to normal, this action taking place without the liability of the regulating action going beyond the amount required.

Instead of the controlling device shown in Fig. 1 I may make use of the modification shown in Fig. 2, in which the arrangement of levers and contacts carried thereby is substantially the same as in Fig. 1, the only difference being in the mode of winding and connecting up the three solenoids acting thereon. These solenoids are connected in multiple with each other and across the mains 1 2, as clearly indicated. The solenoid 50 in addition to having a winding 51 in shunt to the mains 1 2 has a winding 52, which is energized whenever the main contact 53 engages the corresponding coöperating contact 54. The solenoid 55, actuating the other coöperating contact 56, is similarly provided with two windings, one winding, 57, being connected in shunt to the mains 1 2 and the other, 58, energized whenever the main contact 53 engages the coöperating contact 56. The connections of the windings 52 and 58 are made so as to cause the corresponding coöperating contacts controlled thereby to suddenly retreat whenever engaged by the main contact 53. Thus if the main contact 53 were to engage the coöperating contact 54 the winding 52 would be energized, thereby increasing the magnetic pull upon the solenoid-core 59, thus causing an impulsive retreat of the contact 54 and a return movement of the same as soon as the circuit of the coil 52 is broken. Since the coöperating contact 56 moves away from the main contact 53 in response to a weakening of the magnetic force acting upon the magnetic core 60, attached to the bell-crank lever carrying the contact 56, the coil 58 is connected so that when energized it weakens the total pull upon the core 60, thereby producing a retreating of the contact 56.

What I claim as new, and desire to secure by Letters Patent of the United States, is—

1. In an electric regulator, the combination of a main contact controlled by the quantity to be regulated, a coöperating contact also controlled by the quantity to be regulated, and a regulating mechanism responsive to engagement between said contacts.

2. In an electric regulator, the combination of a main contact movable in response to variation of the quantity to be regulated, a coöperating contact also movable in response to the quantity to be regulated but subject to a smaller movement for a given variation of said quantity than that to which the main contact is subject for the same variation, and a regulating mechanism controlled in response to engagement of said contacts.

3. In an electric regulator, the combination of a main contact controlled by the quantity to be regulated, a slower-moving coöperating contact also responsive in its movements to variations of said quantity to be regulated, and a regulating mechanism operative in response to engagement of said contacts.

4. In an electric regulator, the combination of a regulator-controlling mechanism, consisting of a main contact responsive to the quantity to be regulated, two coöperating contacts also responsive to the quantity to be regulated but subject to less movement than the main contact for any given variation of said quantity, and means for causing the coöperating contacts to return to normal position at a slower rate than the rate of return of the main contact.

In witness whereof I have hereunto set my hand this 1st day of November, 1902.

EDWIN W. RICE, Jr.

Witnesses:
BENJAMIN B. HULL,
MARGARET E. WOOLLEY.